US008910148B2

(12) United States Patent
Bowyer et al.

(10) Patent No.: US 8,910,148 B2
(45) Date of Patent: Dec. 9, 2014

(54) PACKAGING AN APPLICATION WITH PLURALITY OF LIBRARIES

(75) Inventors: Helen Samantha Bowyer, Hursley (GB); Kevin Christopher Brown, Hursley (GB); Matthew Robert Whitehead, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/166,053

(22) Filed: Jun. 22, 2011

(65) Prior Publication Data
US 2012/0030667 A1    Feb. 2, 2012

(30) Foreign Application Priority Data

Jul. 29, 2010 (EP) .................................... 10171245

(51) Int. Cl.
*G06F 9/44* (2006.01)
*G06F 9/445* (2006.01)
(52) U.S. Cl.
CPC ....................................... *G06F 8/61* (2013.01)
USPC ............ 717/175; 717/127; 717/154; 717/174
(58) Field of Classification Search
CPC ............................................... G06F 8/60–8/71
USPC .......................... 717/127–135, 154, 162–178; 709/223–226
See application file for complete search history.

(56) References Cited

U.S. PATENT DOCUMENTS

| | | | |
|---|---|---|---|
| 5,574,906 A * | 11/1996 | Morris | 707/640 |
| 5,835,777 A * | 11/1998 | Staelin | 717/175 |
| 6,110,226 A * | 8/2000 | Bothner | 717/153 |
| 6,282,701 B1 * | 8/2001 | Wygodny et al. | 717/125 |
| 7,458,073 B1 | 11/2008 | Darling et al. | |
| 8,065,665 B1 * | 11/2011 | Kosche et al. | 717/127 |
| 8,607,218 B2 * | 12/2013 | Motta et al. | 717/168 |
| 2006/0161898 A1 | 7/2006 | Bauman et al. | |
| 2006/0225072 A1 * | 10/2006 | Lari et al. | 717/175 |
| 2007/0180433 A1 * | 8/2007 | Ghobrial et al. | 717/136 |
| 2008/0098368 A1 * | 4/2008 | Biswas et al. | 717/136 |
| 2008/0229303 A1 | 9/2008 | Carteri et al. | |
| 2010/0242031 A1 * | 9/2010 | Yodaiken et al. | 717/163 |
| 2012/0159470 A1 * | 6/2012 | Yang | 717/175 |

OTHER PUBLICATIONS

Harper, David J., and Andrew DM Walker. "ECLAIR: an extensible class library for information retrieval." The Computer Journal 35.3 (1992), pp. 256-267.*
Callahan, John R., and James M. Purtilo. "A packaging system for heterogeneous execution environments." Software Engineering, IEEE Transactions on 17.6 (1991), pp. 626-635.*
Arsanjani, Ali. "Service-oriented modeling and architecture." IBM developer works (2004), pp. 1-15.*

(Continued)

*Primary Examiner* — Satish Rampuria
(74) *Attorney, Agent, or Firm* — Thomas E. Lees, LLC (57) ABSTRACT

A method for packaging an application, for use with a system comprising the application and a plurality of libraries, the method comprising: in response to runtime execution of the application, monitoring library data associated with at least one of the plurality of libraries that is invoked by the application; associating the library data with an identifier of the application; and using the library data and the application identifier to create a package comprising the application and the at least one of the plurality of libraries.

16 Claims, 4 Drawing Sheets

(56) References Cited

OTHER PUBLICATIONS

Harkema, Marcel, et al. "Performance monitoring of Java applications." Proceedings of the 3rd international workshop on Software and performance. ACM, 2002, pp. 1-14.*

Basili, Victor R., et al. "Characterizing and modeling the cost of rework in a library of reusable software components." Proceedings of the 19th international conference on Software engineering. ACM, 1997, pp. 282-291.*

Shaw, Mary. "Architectural issues in software reuse: its not just the functionality, its the packaging." ACM SIGSOFT Software Engineering Notes 20.SI (1995), pp. 3-6.*

Griss, Martin L. "Software reuse: From library to factory." IBM systems journal 32.4 (1993), pp. 548-566.*

* cited by examiner

PACKAGING AN APPLICATION WITH PLURALITY OF LIBRARIES

CROSS-REFERENCE TO RELATED APPLICATIONS

This application claims priority to European Patent Application No. 10171245.3 filed Jul. 29, 2010, the disclosure of which is incorporated herein by reference.

BACKGROUND

Various aspects of the present invention relate generally to packaging an application.

An application can include references to classes (which perform a particularset of tasks) that are packaged in a library. Typically, there are two types of library used by an application at runtime: an "owned" library and an "external" library. Owned libraries are owned by the application which could be packaged as separate libraries but which are also available at build time and package time so that they can be included in a single distributable package along with the application itself. External (e.g., third party-developed) libraries are not owned by the application, and it is not typically possible or desirable to package and distribute the external libraries with the application.

BRIEF SUMMARY

According to aspects of the present invention, an application is packaged for use with a system having the application and a plurality of libraries. Packaging is performed comprising monitoring, in response to runtime execution of the application, library data associated with at least one of the plurality of libraries that is invoked by the application. The method also comprises associating the library data with an identifier of the application and using the library data and the application identifier to create a package comprising the application and the at least one of the plurality of libraries.

According to further aspects of the present invention, packaging an application for distribution is implemented, comprising monitoring the application running in an operating environment and identifying libraries opened by the application. Packaging is further implemented comprising storing library identifiers associated with the identified libraries in a depository and concatenating the libraries associated with the library identifiers stored in the depository and the application into a package.

BRIEF DESCRIPTION OF THE SEVERAL VIEWS OF THE DRAWINGS

The various aspects of the present invention will now be described, by way of example only, with reference to various embodiments thereof, as illustrated in the following drawings.

DETAILED DESCRIPTION

Figure 1:
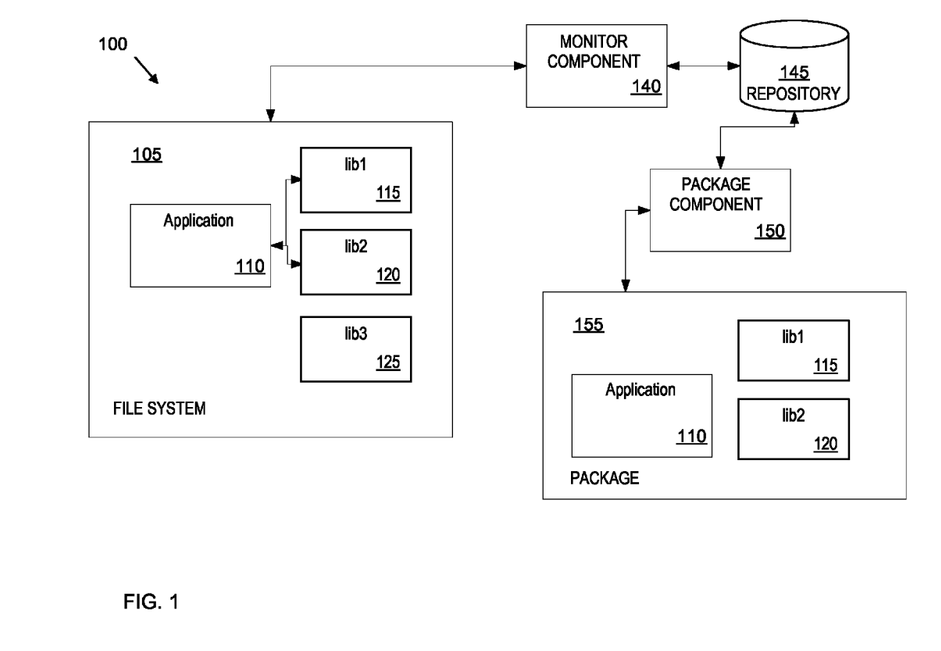
FIG. 1 is a block diagram of a system for packaging an application according to various aspects of the present invention.

FIG. 1 shows a system 100 in which embodiments for packaging an application may be implemented. The system 100 comprises a file system 105 having an application 110 and a number of libraries 115, 120, and 125. The system 100 also comprises a monitor component 140, a repository 145 and a package component 150 for creating a package 155 as will be described herein.

Figure 2:
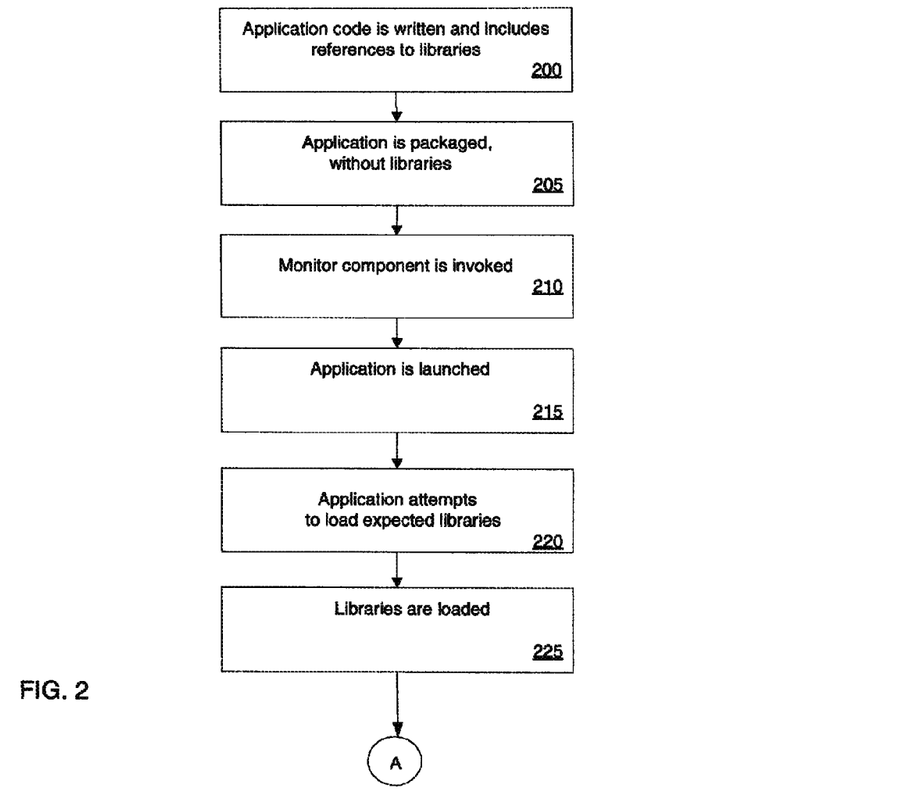
FIG. 2 is a flow chart showing the operations involved in a packaging an application according to various aspects of the present invention.

Referring now to FIG. 2, in pre-processing at 200, program code for the application 110 is written, e.g., by an application developer. The program code includes references to classes defined in external libraries not owned by the application 110. For example, an illustrative program code, designated class1.java, is associated with the source code of the application 110 and includes references to classes, e.g., class 1.class, class2.class, and class3.class, which are defined in external third-party libraries lib1.jar 115, lib2.jar 120, and lib3.jar 125 respectively. As described herein, a library can comprise any number of classes.

At 205, the application 110 is packaged. For instance, keeping with the above-example, class1.java (source code) is compiled into class1.class (e.g., byte code—an executable), which is stored in an archive file, e.g., program1.jar (which is a type of library), along with any accompanying metadata and supplementary files. However, this initial packaging does not include any of the external libraries themselves.

In response to operation of the application 110, the monitor component 140 is invoked at 210.

At 215, the application 110 is launched in its environment (e.g., the file system 105). At 220, when the application 110 hits a step in its execution path which requires a class requiring an associated external library to be loaded, the application 110 attempts to load the library from those available 115, 120, and 125 in the file system 105. For example, keeping with the above-example, assume the application class1.class requires both class2.class and class3.class.

At 225, the libraries which contain the classes are loaded from the file system 105 by the application 110. For example, keeping with the above-example, assume that class2.class and class3.class are contained in libraries lib1.jar 115 and lib2.jar 120 respectively. Since the application 110 requires those classes, the application 110 loads the libraries lib1.jar 115 and lib2.jar 120. However, the application 110 does not require any classes from lib3.jar 125, so that library is not loaded. In this illustrative example, the libraries lib1.jar 115 and lib2.jar 120 are a subset of the libraries that are available 115, 120, and 125.

At 230, the monitor component 140 monitors the application 110 for details of the classes and the libraries that have been loaded.

A file handle is an identifier that is associated with an open file. For instance, an open library, e.g., utils.jar and tools.dll, is treated as a file that has a file handle when open. Correspondingly, a process identifier is used by an operating system to uniquely identify a process. For instance, a process identifier is used by an operating system to identify the application 110. Thus, loading a library, e.g., by the application 110, can be observed by monitoring the library's file handle when it is associated with an application process identifier associated with the application 110.

In illustrative embodiments, the monitor component 140 monitors each file handle associated with the process identifier of the application 110 at runtime over the lifetime of the application 110. Thus, when a library is loaded, loading can be observed by monitoring of operating system functions (e.g., file handles). Typically, each library loaded will have an associated file handle registered in the file system 105 for the duration of time the application 110 takes to load the library and read a class from it.

An exemplary event log of some of the events over the lifetime of the application 110 is shown below. In illustrative embodiments, changes in the file handles over the course of running the application 110 are captured in the event log.

| | | |
|---|---|---|
| 1) 09:34:23 | Application starts | |
| 2) 09:34:24 | Application requires use of class2.class | |
| 3) 09:34:25 | Event - File Handle Open - lib1.jar | |
| 4) 09:34:26 | Application requires use of class3.class | |
| 5) 09:34:28 | Event - File Handle Open - C:\Program Files\abc\lib2.jar | |
| 6) 09:34:29 | Event - File Handle Close - C:\Program Files\abc\lib2.jar | |
| ... | | |
| 14) 09:46:13 | Event - File Handle Close - lib1.jar | |
| ... | | |
| 17) 09:46:14 | Application terminates | |

Preferably, the monitor component 140 parses the event log in order to search for library identifiers. In certain illustrative embodiments, the monitor component 140 does this by searching for known library sub-identifiers (e.g., ".lib" and ".jar").

With reference to the exemplary event log above, the library identifiers contained in the event log are lib1.jar and lib2.jar. In an illustrative example, the application 110 program code originally included references to class2.class, class3.class, and class4.class that are associated with libraries lib1.jar, lib2.jar, and lib3.jar respectively.

The monitor component 140 associates an identifier associated with the application 110 with the library identifiers at 235 and stores the application identifier and each of the library identifiers in the repository 145. The library identifiers can optionally be serialized into a human or machine readable format.

Once the application 110 has finished using the libraries, the libraries are unloaded.

At 240, the application 110 completes execution and is terminated.

By monitoring the exemplary application 110 above, it has been determined that only two classes were required (class2.class; class3.class) and that two associated libraries were loaded (lib1.jar and lib2.jar) even though the application 110 included references to three classes (class2.class, class3.class, and class4.class) each associated with a library (lib1.jar, lib2.jar, and lib3.jar).

At 245, the package component 150 uses the data (e.g., the library identifiers contained in the event log and the application identifier) stored in the repository 145 to access the correct libraries and application in order to create a package 155 that contains the application 110 program code and the associated libraries, lib1.jar 115 and lib2.jar 120, (which are essentially a pre-requisite for execution of the application 110) identified by the library identifiers. The package 155 represents a distributable unit that can be distributed for re-use in other environments. Note that lib3.jar 125 does not need to be included in the package 155.

According to aspects of the present invention, in a different environment, the application 110 may use each of the classes or a different subset of the classes referenced and thus, by monitoring the application in a different environment, a different package from the one described above may be created.

In an example Java implementation, the application 110 is packaged in a .jar file at 205. Java and all Java-based trademarks and logos are trademarks of Sun Microsystems, Inc. in the United States, other countries, or both. At 235, the monitor component 140 records in the repository 145, a list of .jar files associated with external libraries that are required by the application 110. As a result, at 245, the package component 150 builds a package comprising a .zip file containing the application .jar file and each of the external library .jar files. The .zip file can be distributed to another environment where it can be unpackaged into the application 110 .jar file and each of the external library .jar files. Thus, when the application 110 is run in the other environment, the external library .jar files are guaranteed to be available to the application 110 when the application 110 tries to load those libraries.

In another example, at 235, the monitor component 140 records in the repository 145, a list of DLL files associated with external libraries that are required by the application 110 (e.g., "myprogram.exe"). As a result at 245, the package component 150 builds a package 155 comprising a .zip file containing the application executable (namely "myprogram.exe") and each of the DLL files. The .zip file can be distributed to another environment where it can be unpackaged into the application 110 executable and each of the DLL files. Thus, when the application 110 is run in the other environment, the external library DLLs are guaranteed to be available to the application 110 when the application 110 tries to load those libraries.

Even though the examples recite that a .zip file is used for packaging the application and external libraries, any suitable techniques may be used.

It is typically not possible to distribute a fully operable application without specifying that its operating environment already has each of the necessary external libraries installed. Also, an application can contain code which will attempt to load required libraries at runtime, and if the libraries are not available, the application either terminates because it cannot continue or continues with limited and/or different behavior based on the lack of additional code. Further, it is also common for an application to require only a subset of tasks, and hence only a subset of libraries. Further, at application development time, a developer may not know the exact name of a class required (and thus which library is required). Also, in general, it can be difficult to determine which libraries are required by an application at runtime without having a detailed knowledge of the contents of the libraries or making more libraries available to a failing application until the application successfully functions.

However, according to aspects of the present invention, external libraries no longer need to be separately installed in each environment as a package containing the application, and the relevant libraries can be created by using various aspects of the present invention set out in greater detail herein.

Further, according to illustrative embodiments herein, library meta-data can be captured at runtime in response to monitoring of libraries, including libraries that are loaded unexpectedly by the application 110. Thus, illustrative embodiments provide the ability to log unexpected library dependencies, expected library dependencies, or both.

Also typically, if a package containing the application and associated external libraries were to be created, often, every possible external library required is packaged with the application to ensure that the libraries that are actually required at runtime are available to the application—this is onerous, inefficient and creates a package that can have a very large footprint. Further, if a packed is not to be created, separate of each library is required in the application runtime environment.

However, aspects described more fully herein, facilitate efficient packaging of libraries. For instance, each of the libraries associated with classes referenced in the application 110 program code may not need to be packaged, thus reducing the footprint of the application 110.

Further, there is no need for complex and time-consuming manual analysis of each library associated with classes referenced in the application 110 program code in order to determine which libraries are actually required.

Moreover, a typical scenario is handled, wherein libraries can be loaded and unloaded during any stage of execution of the application. By only monitoring file handles during a particular phase of application 110 execution, identification of libraries required at a later stage in the application lifecycle may not occur. However, monitoring an application 110 over its full lifetime maximizes the number of libraries that are discovered.

Certain embodiments also handle a typical scenario wherein some environments (e.g., operating systems or application runtimes) do not store file handles to libraries that are used by the application 110. The required code is loaded into memory, and the file handle is subsequently closed. As in the example above, monitoring an application 110 over its full lifetime advantageously helps to minimize this limitation.

Figure 3:
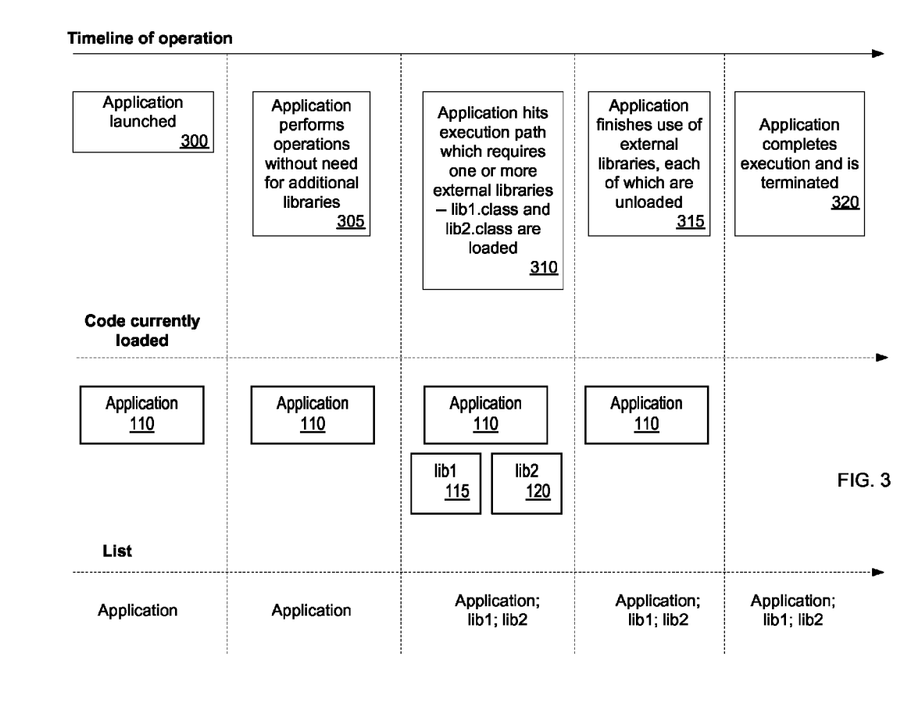
FIG. 3 is a representation of changes in information gathered and code components loaded over the lifetime of an application according to various aspects of the present invention.

With reference to FIG. 3, a bottom timeline labeled "List" depicts a representation of information built up, e.g., using techniques described more fully herein, over the lifetime of an application. The middle timeline labeled "Code currently loaded" depicts program code components that are loaded in the environment. The top timeline labeled "Timeline of operation" depicts the lifetime of the application.

With reference to the "Timeline of operation" timeline, at step 300 (equivalent to 215 of FIG. 2), the application 110 is launched in its environment. Moving to the "Code currently loaded" timeline, the application 110 is the program code component that is loaded in the environment. Moving to the "List" timeline, an identifier associated with the application 110 is stored in the repository 145.

With reference to the "Timeline of operation" timeline, at 305, the application 110 performs operations without requiring additional libraries. Moving to the "Code currently loaded" timeline, the application 110 is still the only program code component that is loaded in the environment. Moving to the "List" timeline, an identifier associated with the application 110 remains stored in the repository 145.

With reference to the "Timeline of operation" timeline, at 310 (equivalent to 220 of FIG. 2), the application 110 hits a step in its execution path which requires loading a subset of the libraries that are referenced to be loaded. Thus, the required libraries are loaded. Moving to the "Code currently loaded" timeline, the application 110 and the required libraries (e.g., lib1.class and lib2.class) are the program code components that are loaded in the environment. Moving to the "List" timeline, an identifier associated with the application 110 remains stored in the repository 145, and identifiers associated with the required libraries are stored with the application 110 identifier in the repository 145.

With reference to the "Timeline of operation" timeline, at 315, once the application 110 has finished using the libraries, the libraries are unloaded. Moving to the "Code currently loaded" timeline, the application 110 is the only program code component that is loaded in the environment. Moving to the "List" timeline, the application 110 identifier and identifiers associated with the required libraries remain stored in the repository 145.

With reference to the "Timeline of operation" timeline, at 320 (equivalent to 235 of FIG. 2), the application 110 completes execution and is terminated. Moving to the "Code currently loaded" timeline, no program code components are loaded in the environment. Moving to the "List" timeline, the application 110 identifier and identifiers associated with the required libraries remain stored in the repository 145.

According to aspects set out more fully herein, there is provided a method for packaging an application, for use with a system comprising the application and a plurality of libraries. The method comprises monitoring library data, in response to runtime execution of the application, which is associated with at least one of the plurality of libraries that is invoked by the application, associating the library data with an identifier of the application, and using the library data and the application identifier to create a package comprising the application and the at least one of the plurality of libraries.

According to further aspects set out more fully herein, there is provided a computer program comprising computer program code stored on a computer readable medium to, when loaded into a computer system and executed thereon, cause said computer system to perform the above-stated method.

According to still further aspects set out more fully herein, there is provided an apparatus for packaging an application, for use with a system comprising the application and a plurality of libraries. The apparatus comprises a monitor component, responsive to runtime execution of the application, for monitoring library data associated with at least one of the plurality of libraries that is invoked by the application; means for associating the library data with an identifier of the application; and a package component for using the library data and the application identifier to create a package comprising the application and the at least one of the plurality of libraries.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for packaging an application, for use with a system comprising the application and a plurality of libraries, the method comprising:

monitoring, in response to runtime execution of the application, library data associated with at least one of the plurality of libraries that is invoked by a process identifier of the application, wherein the application invokes at least one of the plurality of libraries in response to reaching a point in its execution path where one or more classes are required;

associating the library data with an identifier of the application, wherein the identifier of the application is a file handle invoked by the process identifier of the application; and using the library data and the application identifier to create a package comprising the application and an entirety of the at least one of the plurality of libraries, wherein the entirety of the at least one of the plurality of libraries includes one or more required libraries which are program code components that are loaded in an environment.

2. The method of claim 1, further comprising storing the library data and the application identifier in a repository.

3. The method of claim 1, wherein monitoring further includes monitoring the application over the lifetime of the execution of the application.

4. Computer-readable hardware with an executable program for creating a package for an application for use with a system comprising the application and a plurality of libraries stored thereon, wherein the program includes instructions for a microprocessor to perform:

monitoring, in response to runtime execution of the application, library data associated with at least one of the plurality of libraries that is invoked by a process identifier of the application, wherein the application invokes at least one of the plurality of libraries in response to reaching a point in its execution path where one or more classes are required;

associating the library data with an identifier of the application, wherein the identifier of the application is a file handle invoked by the process identifier of the application; and using the library data and the application identifier to create a package comprising the application and an entirety of the at least one of the plurality of libraries, wherein the entirety of the at least one of the plurality of libraries includes one or more required libraries which are program code components that are loaded in an environment.

5. The computer-readable hardware of claim 4, wherein:
instructions for monitoring further includes instructions for monitoring the application over the lifetime of the execution of the application.

6. The computer-readable hardware of claim 4, further comprising instructions for invoking at least one of the plurality of libraries in response to reaching a point in its execution path where one or more classes are required.

7. A method of packaging an application for distribution, the method comprising:

monitoring the application running in an operating environment, wherein the application invokes libraries in response to reaching a point in its execution path where one or more classes are required;

identifying the libraries opened by the application and associating the libraries with an identifier of the application, wherein the identifier of the application is a file handle invoked by a process identifier of the application;

storing library identifiers associated with the identified libraries in a depository; and concatenating an entirety of the libraries associated with the library identifiers stored in the depository and the application into a package, wherein the entirety of the libraries includes one or more required libraries which are program code components that are loaded in the operating environment.

8. The method of claim 7, wherein identifying libraries opened by the application includes monitoring operating system functions of the operating environment while the application is running.

9. The method of claim 7, wherein identifying libraries opened by the application includes parsing an event log for library identifiers.

10. The method of claim 9, wherein parsing the event log includes searching for known library sub-identifiers.

11. The method of claim 7, further including compressing the package before distributing the package.

12. Computer-readable hardware with an executable program for creating a package for an application for use with a system comprising the application and a plurality of libraries stored thereon, wherein the program includes instructions for a microprocessor to perform:

monitoring the application running in an operating environment, wherein the application invokes libraries in response to reaching a point in its execution path where one or more classes are required;

identifying the libraries opened by the application and associating the libraries with an identifier of the application, wherein the identifier of the application is a file handle invoked by a process identifier of the application;

storing library identifiers associated with the identified libraries in a depository; and concatenating an entirety of the libraries associated with the library identifiers stored in the depository and the application into a package, wherein the entirety of the libraries includes one or more required libraries which are program code components that are loaded in the operating environment.

13. The computer-readable hardware of claim 12, wherein:
instructions to perform identifying libraries opened by the application includes instructions for monitoring operating system functions of the operating environment while the application is running.

14. The computer-readable hardware of claim 12, wherein:
instructions for identifying libraries opened by the application includes instructions for parsing an event log for library identifiers.

15. The computer-readable hardware of claim 14, wherein:
instructions for parsing the event log includes instructions for searching for known library sub-identifiers.

16. The computer-readable hardware of claim 12, further including instructions for compressing the package before distributing the package.

* * * * *